United States Patent

Johannsen

[11] 3,877,727
[45] Apr. 15, 1975

[54] RETRACTABLE BICYCLE TRAINING WHEELS

[76] Inventor: Kenneth L. Johannsen, 1111 W. Cedar Ln., Arlington Heights, Ill. 60007

[22] Filed: July 16, 1973

[21] Appl. No.: 379,554

Related U.S. Application Data

[63] Continuation of Ser. No. 120,606, March 3, 1971, Pat. No. 3,746,367.

[52] U.S. Cl. .............................. 280/301; 280/150 A
[51] Int. Cl. ........................... B62h 1/10; B62h 7/00
[58] Field of Search ........... 280/293, 295, 296, 301, 280/150 A

[56] References Cited
UNITED STATES PATENTS

| | | | |
|---|---|---|---|
| 586,040 | 7/1897 | Judge | 280/293 |
| 762,558 | 6/1904 | Rhodes | 280/301 |
| 1,177,290 | 3/1916 | Tollstam | 280/293 |
| 1,185,381 | 5/1916 | Dawson | 280/295 |
| 1,369,116 | 2/1921 | Krahn | 280/296 |
| 1,855,172 | 4/1932 | Hess | 280/293 |
| 1,966,205 | 7/1934 | Johnson | 280/301 X |
| 2,541,952 | 2/1951 | Williams | 280/296 X |
| 3,642,305 | 2/1972 | Pawsat | 280/293 |

FOREIGN PATENTS OR APPLICATIONS

| | | | |
|---|---|---|---|
| 8,680 | 4/1896 | United Kingdom | 280/301 |
| 27,411 | 12/1896 | United Kingdom | 280/301 |
| 1,193,906 | 11/1959 | France | 280/293 |

*Primary Examiner*—David Schonberg
*Assistant Examiner*—John P. Silverstrim
*Attorney, Agent, or Firm*—Alter, Weiss, Whitesel & Laff

[57] ABSTRACT

An L-shaped bracket is attached to a vertical structural member of a bicycle. Pivotally attached to the bracket is a plate which folds between a raised or a lowered position and latches in either of these two positions. A second embodiment incorporates an adjustable sliding collar which causes a strut to be fixed in either a raised or a lowered position. Auxiliary wheels are mounted on the plate in the first embodiment and at the end of the strut in the second embodiment. A third embodiment of the invention involves a wheel on a bracket which rotates from a lowered position into a raised position.

4 Claims, 9 Drawing Figures

PATENTED APR 15 1975
3,877,727
SHEET 1 OF 3
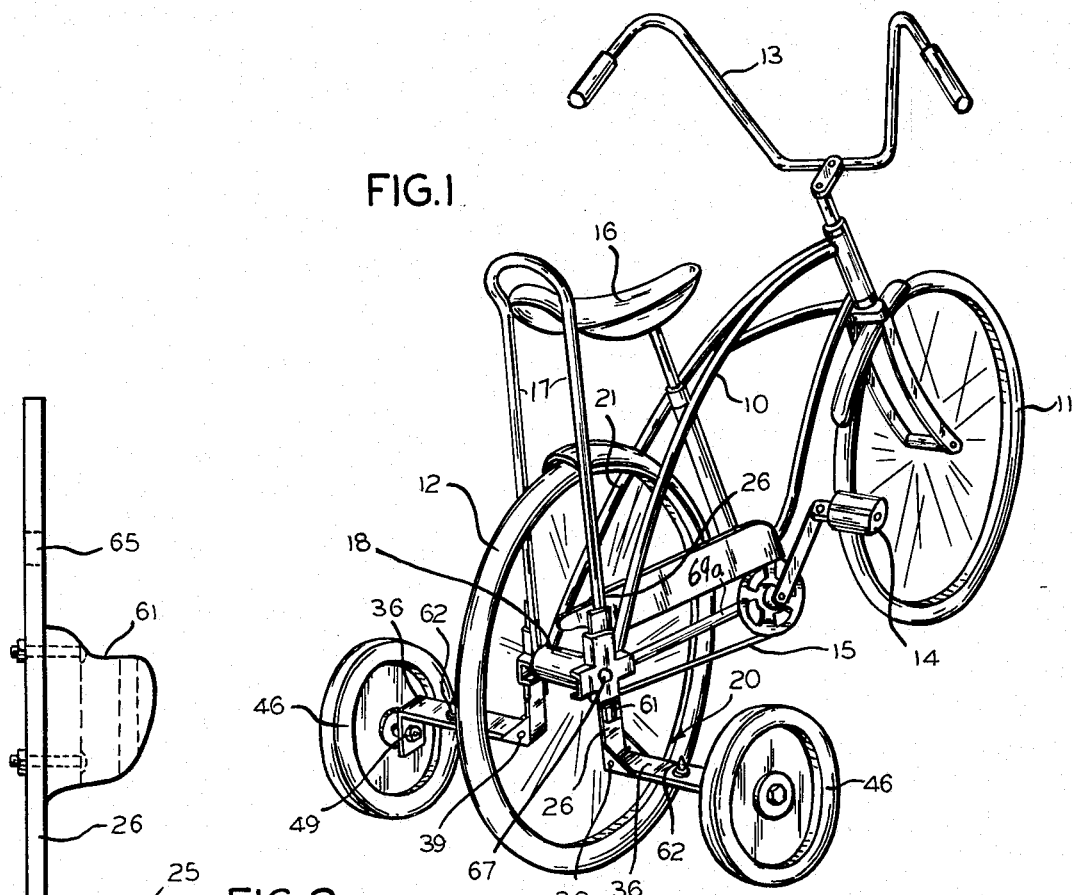
FIG.1
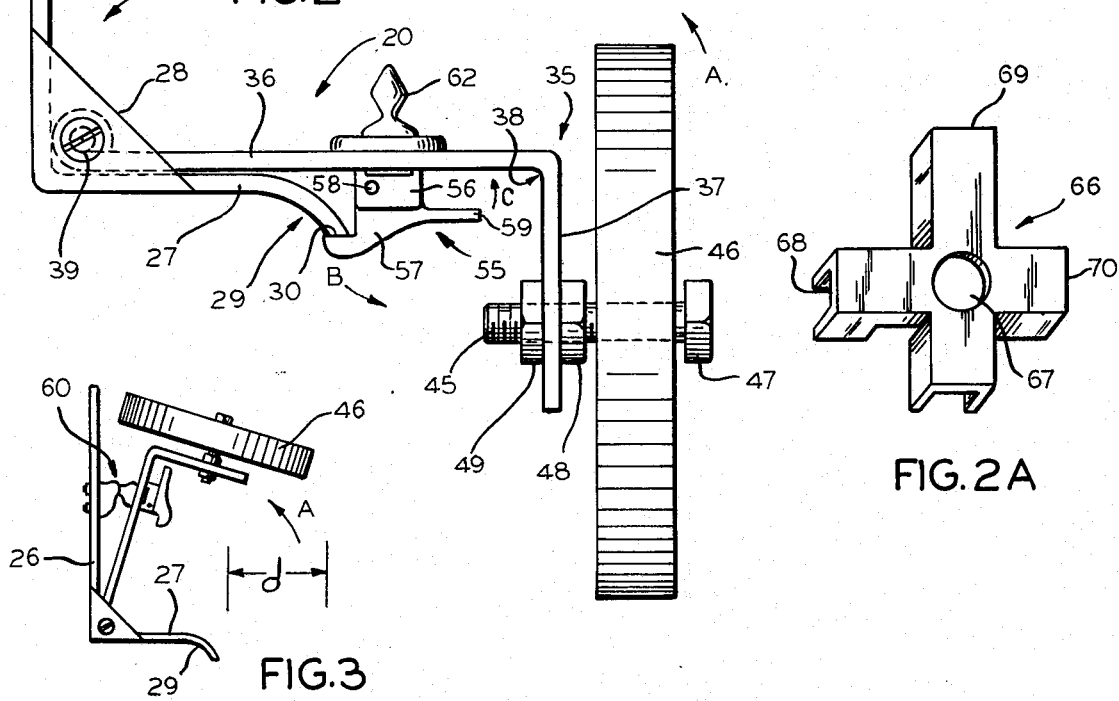
FIG.2
FIG.2A
FIG.3

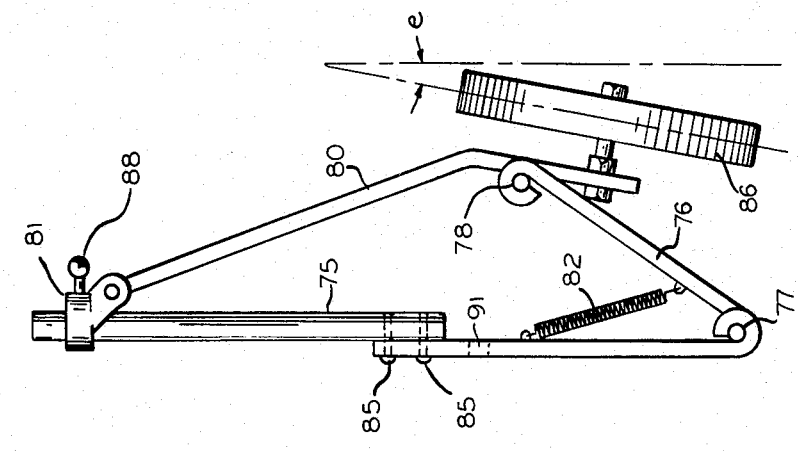
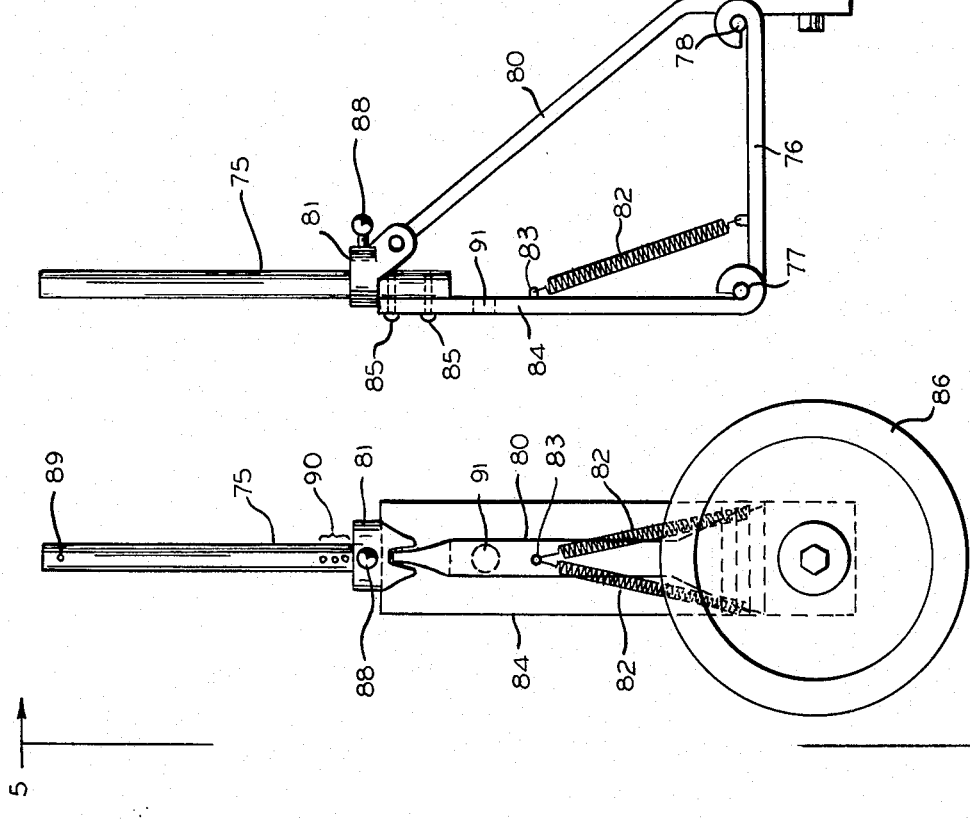

RETRACTABLE BICYCLE TRAINING WHEELS

This is a continuation of application Ser. No. 120,606, filed on Mar. 3, 1971, now U.S. Pat. No. 3,746,367.

This invention relates to auxiliary bicycle wheels for stabilizing vertical alignment of said bicycle, and more particularly to retractable auxiliary wheels.

Hereinafter, the inventive auxiliary wheels are described as "training wheels" since this is the most common use of the wheels. However, this term is also used to include any auxiliary stabilizing bicycle wheels regardless of whether they are used for training a child to ride a bicycle, for stabilizing a towed motorcycle, or the like.

Bicycle riding generally requires coordination and balance, which comes from riding experience. In order to acquire such experience, it is common practice to attach a pair of small, auxiliary wheels at the back of the bicycle to give stability despite the inexperienced rider's lack of balance. The attachment and removal of such wheels is a time consuming chore; thus, the user is reluctant to remove the wheels until after the inexperienced rider has completed his training. Meanwhile, if someone else wishes to ride the bicycle, he has the choice of riding with the training wheels in place or of not riding at all.

In addition, the beginner's needs and skills change; therefore, it is desirable to provide optional usage of training wheels during a period of time after the beginner has acquired some degree of basic skill, but before he is a fully experienced rider. For example, the beginner may be able to ride two-wheeled over a clean, dry, cement pavement. However, the same beginner could not ride two-wheeled over the same surface covered by a thin layer of loose sand, for example. Thus, it would be desirable for the beginner to be able to ride without training wheels until he comes to the loose sand. There, he should be able to stop, lower the training wheels, and then ride on until he again comes to clean, dry pavement where the training wheels are raised and two-wheeled riding is resumed.

The training wheels in common use are very often unsuitable since they tend to rotate in planes which are not exactly parallel to the planes of the main bicycle wheels. Thus, the mis-aligned wheel tends to drag slightly sidewise, which often bends the wheel mounting brackets. As the brackets bend, the dragging force increases the tendency to bend the brackets still further. Soon the training wheels are a greater hinderance than help.

Finally, these training wheels should be relatively low cost. They are used for only a short period of time, and the beginner is reluctant to spend very much for them. Thus, there are the conflicting needs of sturdy, precisely aligned, retractable wheels which do not cost very much.

Accordingly, there is a need for new and improved training wheels. In greater detail, an object is to provide training wheels which are simple to attach and remove, sturdy enough to withstand severe abuse, and yet sell for very low cost. In addition, an object is to provide wheels which are so simple to retract that even a small child can manipulate them. In particular, an objective is to provide a retracting mechanism which will not fail even if a child operates them in an inept manner.

Yet another object is to provide training wheels which may be manufactured at low cost on general purpose machines. Here, an object is to provide training wheels which may be manufactured by a company just entering such manufacturing business, without requiring a substantial amount of capital to so enter the market.

In keeping with an aspect of this invention, a first embodiment incorporates an L-shaped bracket attached to a vertical structural member of a bicycle. Pivotally attached to the bracket is a plate which folds between a raised or a lowered position and latches in either of these two positions. A second embodiment incorporates an adjustable sliding collar adjustably attached to a pipe carried on the bracket. The collar causes a strut to be fixed in either a raised or a lowered position. Training wheels are mounted on the plate in the first embodiment and at the end of the strut in the second embodiment.

The nature of a preferred embodiment of the invention for accomplishing these and other objects may be understood best from a study of the following description and the attached drawing in which:

FIG. 1 is a perspective view of a bicycle with a first embodiment of the invention attached thereto;

FIG. 2 is a side elevation view of the first embodiment showing the parts with the training wheel latched in a lowered position;

FIG. 2A shows a cruciform attaching bracket plate which is used to attach and stabilize the training wheels to the bicylce;

FIG. 3 is a perspective view which shows the training wheel of the first embodiment in a fully raised position;

FIG. 4 is a side elevation view which shows a second embodiment of the invention with the training wheels in a fully lowered position.

FIG. 5 is a side view of the second embodiment of the training wheels in a fully lowered position;

FIG. 6 is a side view of the second embodiment of the training wheels in a fully retracted position;

Figure 7:
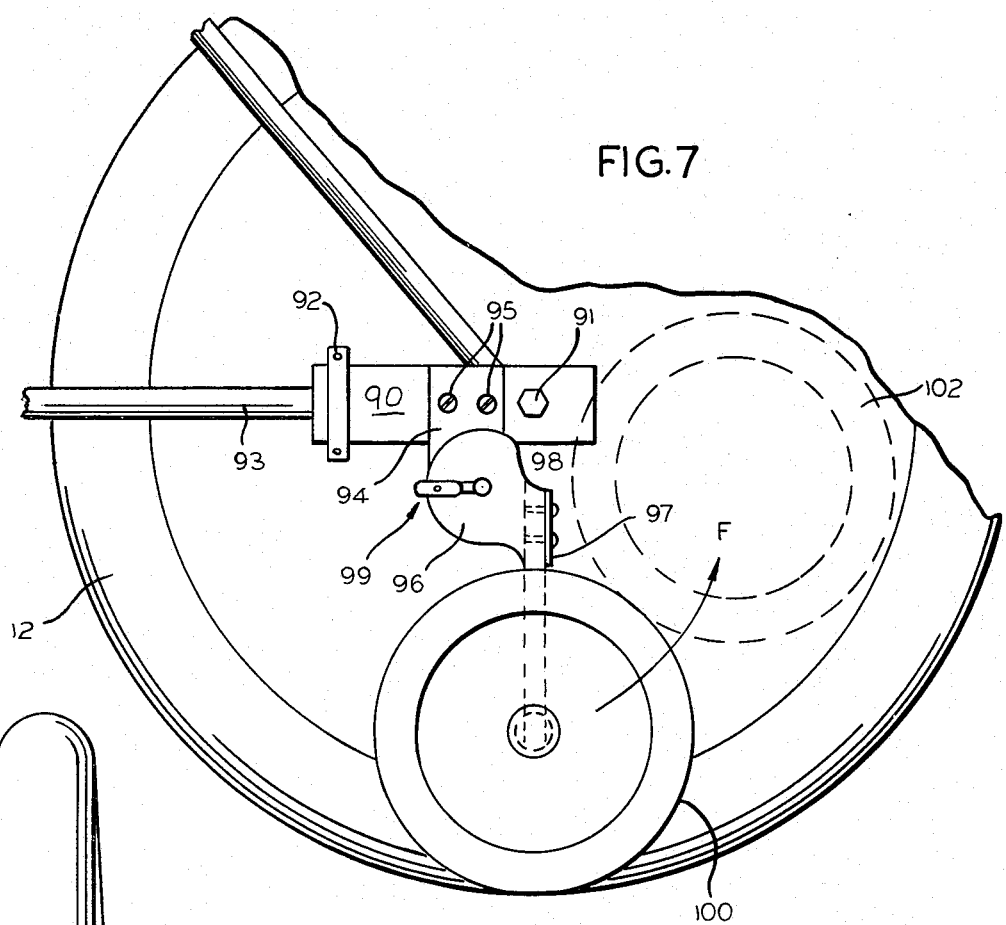
FIG. 7 is a side elevation view of a third embodiment of the invention with the training wheels in a fully lowered position.

The bicycle of FIG. 1 is here shown as including the usual frame 10, front and back wheels 11, 12, handle bars 13, pedals 14, and chain 15. In this particular example, the saddle 16 is supported at two points, first by the vertical frame over pedals 14 and associated sprocket. A second saddle supporting frame 17, in the form of a hairpin, extends from the back of the saddle to the rear axle 18. This particular type of saddle is here shown since it is popular with the age group which is most likely to use training wheels. However, it should be understood that other saddles may also be used.

Means are provided for removably and retractably attaching a pair of training wheels to the bicycle. More particularly, a single, suitable bracket 20 is attached exclusively to the rear axle 18 and stabilized by an attachment bracket touching — but not attached to — a bicycle frame member. Here, the stabilization for the attachment bracket is conveniently provided by the saddle support member 17. In case another type of saddle is used, the stabilization for the attachment bracket may be obtained by an engagement with some other structural member, such as the back wheel support 21.

The exact nature of the bracket 20 should become more apparent from a study of FIG. 2. In greater detail, an outer L-shaped bracket 25 has an upstanding member 26 and a horizontal member 27 joined at substantially right angles and braced in position by suitable reinforcing plates or tabs 28. The outer tip of the horizontal member 27 bends downwardly somewhat, as at 29, to provide a catch seat at 30.

A second and inverted, inner L-shaped bracket 35 is hinged to bracket 20 between the reinforcing plates or tabs 28. More particularly, the bracket 35 comprises two members 36, 37, preferably bent, at 38, to substantially a right angle. The outer extremity of the arm 36 is hinged to a hingepin 39 which passes through the plates 28; therefore, it can swing from the position shown in FIG. 2, in the direction A. The arm 37 includes an aperture or other suitable support means for receiving an axle 45 for rotatably supporting a training wheel 46. The axle 45 includes a hub 47 for capturing and retaining the wheel 46 in an area defined, on the inner side, by a collar or a locknut 48. The outer end of the axel 45 is captured and rigidly held in place on bracket arm 37 by a nut 49. Thus, the wheel 46 is free to rotate in an unencumbered manner.

The foregoing use of the terms "inner" and "outer" is for convenience of expression only. It should be understood that these relevant terms depend upon the viewpoint taken by the reader. In this particular case, these terms are used since member 36 is hinged at point 39 which is inside the L formed by the brackets 26, 27. Therefore, no particular significance should be attached to this particular use of these terms.

Means are provided for latching the wheel into either an extended or a retracted position. In greater detail, a first latch 55 includes a bifurcated post 56 rigidly attached to the arm 36. A latch member 57 is pivotally attached between the bifurcations by means of a pin 58, so that the latch member may raise, in the direction B, when the lever 59 is pushed in direction C. A bias spring inside the post 56 normally forces the latch member 57 to the capture position seen in the drawing.

A second latch member 60 (FIG. 3) comprises a spring clip or captureing member 61 (FIG. 2) and a detent ball or captured member 62. The cap 61 is affixed to the outer vertical bracket member 26, and the detent member 62 is affixed to the inner horizontal member 35. When the arm 35 swings to the extremity of its motion in direction A, the ball 62 is captured in the spring clip 61 (FIG. 3).

The methods used to attach the training wheels exclusively to the rear axle of the bicycle may vary, depending upon the bicycle frame structure. In greater detail, the arm 26 includes a hold 65 which is sized to fit over the axle 18 of the bicycle. The vertical position of this hole fixes the elevation of the training wheels relative to the ground. Therefore, it may be desirable to provide a series of holes for thereby giving a height adjustment.

FIG. 2A shows a cruciform attaching bracket plate shaped to fit over the bicycle axle and frame and over the training wheel bracket member 26 and on the bicycle axle. Thus, the hole 65 is fitted over the axle 18 (FIG. 1) and then the hole 67, in bracket 66, is also fitted over the same axle. A first arm 68 of the cruciform shape fits over a bicycle frame member or strut 69a (FIG. 1). A second arm 69 fits over the training wheel bracket 26 and the seat support 17. A third arm 70 fits over a rearward extension of the frame member or strut 69a. Finally, the fourth arm of the cruciform shape also fits over the bracket member 26, thereby giving great stability to the training wheels without requiring any mechanical clamping to the bicycle frame, per se.

The invention contemplates supplying any suitable number of differently shaped, attaching bracket plates (such as that shown in FIG. 2A) to fit different bicycles. Thus, the same training wheel may be attached to virtually any bicycle by the simple expedient of selecting and using the proper attaching bracket plate.

The operation of the training wheel mounting member should now be apparent. When the training wheels are in use, they are lowered to the ground level where the latch 55 snaps over the outer tip 29, thus making a locking engagement at 30. Then, the lever 59 is moved in direction C so that the latch end releases the tip 29. As seen in FIG. 3, the wheel 46 may then swing upwardly in the direction A.

When the wheel 46 reaches the most elevated position, the detent 62 is captured by the spring clamp 61.

Means are provided for guarding nearby objects to preclude their damage by the projecting training wheel mounts. In greater detail, the tire of the wheel 46 projects outwardly beyond the tip 29 of the bracket plate 25 by a distance $d$. Thus, the tire provides a soft and pliable bumper which protects nearby objects against damage by the tip 29.

A second embodiment of the invention is seen in FIGS. 4–6. Here, the training wheel mounting bracket comprises a vertical tubular member 75 and a horizontal member 76 hinged together at 77. Pivotally attached at 78 to the outer extremity of the arm 76 is a wheel support and outrigger strut 80 extending to a collar 81 sliding on the vertical tubular member 75. A vertical mounting bracket 84 is connected at its upper end to the tubular member 75 by any suitable means, such as rivets 85. A pair of suitable coiled springs 82 are attached between a point 83 on the vertical mounting bracket 84 and the horizontal arm. The coiled springs are tensioned when the training wheels 86 are in a lowered or operating position; therefore, the springs tend to raise the wheels 86 unless they are restrained in a lower position.

The mounting bracket plate 84 includes a hole 91 fitting over the axle 18 of the bicycle wheel. This bracket plate 84 may be attached to the bicycle by means of any suitable attachment plate 66 (FIG. 2A) selected to be fitted to any particular bicycle frame.

Means are provided for selectively positioning the training wheels in either a raised or a lowered position. In greater detail, the collar 81 includes a spring loaded pin 88 which snaps into holes 89, 90 in the tubular member 75. Thus, the pin may be pulled out, and the collar 81 may be raised to the vicinity of the hole 89. There the pin 88 is released and the collar is further slid until the pin drops into the hole 89. Contraction of the springs 82 counterbalances the weight of the wheel 86.

To lower the wheel 86, the pin 88 is pulled and the collar 81 is pushed downwardly to a selected position. Then, the pin 88 is released near a selected one of the holes 90. A final sliding adjustment of the collar position allows the pin 88 to drop into one of the holes 90 under its own spring tension. This way the wheels 86 may be lowered into any of several lower positions or raised to the retracted position of FIG. 6.

The tipped angle $e$ of the training wheel 86 is such that the rubber tires are struck if the bicycle is ridden too close to a nearby object.

Figure 8:
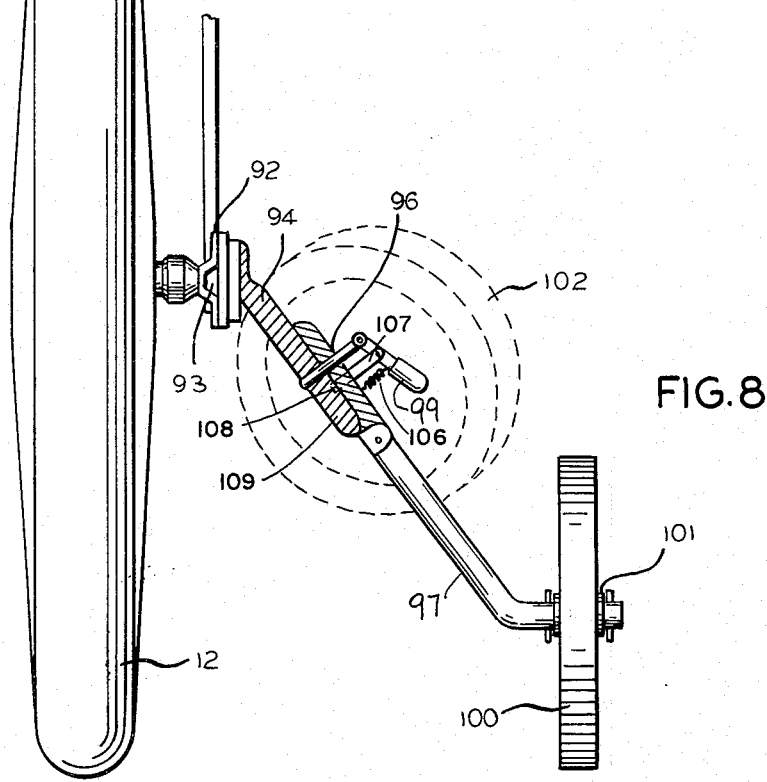
FIG. 8 is a front elevation view of a third embodiment with the training wheels in a fully lowered position.

A third embodiment of the invention is seen in FIGS. 7 and 8. Here the training wheel mounting bracket comprises a first rectangular, horizontally oriented bracket 90 having a hole at one end which fits over the bicycle axle 91. If desired, a clamp 92 may be supplied at the other end of bracket 90 to bolt over a horizontal bicycle frame member 93. However, this bracket is not required since stabilization may be achieved through the use of the attachment mounting plate of FIG. 2A.

A second mounting bracket 94 is attached to the first bracket 90 by any suitable means, such as bolts 95. The lower end of the bracket 94 is somewhat circular. A second, somewhat circular plate 96 is rotatably positioned over the circular end of the plate 94. An arm 97 attached to plate 96 swings, in a direction F, about an axis 98. A spring loaded clip 99 or latch may be rotated or pulled horizontally away from the plate 96 to release an interlatching connection between the two plates 94, 96. When the arm 97 swings to its fully retracted position, the clip 99 may be released so that the arm 97 is locked in its raised position. The clip 99 is spring loaded by means such as the schematically shown spring 106 which normally forces locking pin 107 into selected ones of a plurality of circularly disposed openings, such as opening 108, in circular end 109 of bracket 94.

The end of the arm 97 is bent somewhat to a horizontal position to rotatably receive the hub of a training wheel 100. The wheel may be secured in place by any suitable means such as a cotter pin and washer 101.

In operation, the clip 99 may be lifted to remove pin 107 from opening 109, and the arm 97 swung to a raised or retracted position when the clip is released to lock the wheel. The retracted position of the training wheel is shown by dashed lines at 102.

As best seen in FIG. 8, in retracted position 102, the rubber tire of the training wheel projects outwardly beyond all metal parts so that nearby objects are protected against damage from hard metal parts.

Other and further modifications may readily occur to those who are skilled in the art. Therefore, the appended claims are to be construed to cover all equivalent structures which may fall within the spirit and the scope of the invention.

I claim:

1. Auxilliary bicycle wheels comprising:
   mounting means for mounting auxilliary wheel holding brackets on each side of the rear axle of the bicycle,
   said mounting means comprising a first bracket attached to the axle of said bicycle,
   a second bracket dependent therefrom,
   said second bracket including a circular end thereon,
   a third bracket with a somewhat circular endplate rotatably positioned over said circular end of said second bracket,
   said third bracket supporting an auxilliary bicycle wheel, the relative rotation between said second and third brackets moving said auxilliary wheel between a lowered, ground engaging position and a raised, retracted position,
   said somewhat circular endplate being set at an angle relative to the vertical position of said bicycle, whereby said auxilliary wheel is horizontally disposed from the rear wheel of said bicycle when in said lowered position,
   wheel axle means for connecting said auxilliary wheel to the third bracket so that the periphery of said auxilliary wheel is parallel to the periphery of the rear wheel of said bicycle, when in the lowered position, and the periphery of said auxilliary wheel is angularly disposed away from the periphery of said rear wheel when in said retracted position,
   latch means for latching said auxilliary wheel in either the lowered or the retracted position, said latch means comprising a spring loaded locking pin for releasably locking said circular end against rotation relative to said end plate in both said retracted and said lowered position,
   said locking pin being movable relative to both said endplate and said circular end for extention through said end plate into holding contact with openings in said circular end when said auxilliary wheel is in either said lowered or said retracted position.

2. The auxiliary bicycle wheels of claim 1 wherein said openings are disposed to engage and capture said pin under the influence of said spring loading.

3. The auxiliary bicycle wheels of claim 2 wherein said auxiliary wheels have tires made from resilient material,
   said tires projecting outwardly from said bicycle when retracted to make first engagement with nearby objects if said bicycle is ridden too close to said nearby objects, thereby protecting said objects from damage.

4. The auxiliary bicycle wheel of claim 1 wherein said latch means comprises a third bracket axle means,
   said third bracket rotating about said third bracket axle means, and
   said latch means having a latched position for preventing rotation of said third bracket and an unlatched position for enabling said third bracket to rotate and change the position of said auxilliary wheel.

* * * * *